United States Patent [19]

LaVanture

[11] 4,424,656
[45] Jan. 10, 1984

[54] ASSEMBLY CLIP FOR CEILING PANELS

[75] Inventor: Alonzo A. LaVanture, Schaumburg, Ill.

[73] Assignee: Airtex Corporation, Chicago, Ill.

[21] Appl. No.: 269,357

[22] Filed: Jun. 1, 1981

[51] Int. Cl.³ .............................................. E04C 1/10
[52] U.S. Cl. ...................................... 52/584; 52/588; 52/712
[58] Field of Search ................ 52/584, 588, 712, 489, 52/485, 768, 582, 766; 24/259 R, 259 FS; 165/171; 24/221 R, 221 A, 221 K, 248 R, 248 B; 403/338

[56] References Cited

U.S. PATENT DOCUMENTS

| | | |
|---|---|---|
| Re. 27,827 | 12/1973 | Ledoux . |
| 2,209,580 | 7/1940 | Sargent ............................ 52/584 X |
| 2,818,235 | 12/1957 | Baran . |
| 2,859,710 | 11/1958 | Elsner . |
| 2,887,565 | 5/1959 | Baran . |
| 3,049,341 | 8/1962 | Kemp . |
| 3,072,183 | 1/1963 | Barbier et al. . |
| 3,080,914 | 3/1963 | Shippee et al. . |
| 3,091,487 | 5/1963 | Gallagher et al. ............... 24/259 X |
| 3,305,003 | 2/1967 | Rothschild . |
| 3,363,381 | 1/1968 | Forrest . |
| 3,431,692 | 3/1969 | Freeman ......................... 52/582 X |
| 3,535,842 | 10/1970 | Karn ................................ 52/584 X |
| 3,602,473 | 8/1971 | Varriet et al. . |
| 3,650,080 | 3/1972 | Leale, Sr. . |
| 3,716,027 | 2/1973 | Vickstrom et al. .............. 52/588 X |
| 3,798,865 | 3/1974 | Curtis . |
| 3,858,996 | 1/1975 | Jarvis . |
| 4,067,090 | 1/1978 | Schenk ........................... 24/221 K |
| 4,080,703 | 3/1978 | Beck, Jr. . |
| 4,086,913 | 5/1978 | Gavin . |
| 4,120,284 | 10/1978 | Cotsworth et al. . |
| 4,164,935 | 8/1979 | Marles et al. . |
| 4,170,221 | 10/1979 | Gavin . |
| 4,217,887 | 8/1980 | Hoffman et al. . |
| 4,366,603 | 1/1983 | Hulse .............................. 24/221 R |

Primary Examiner—Carl D. Friedman
Attorney, Agent, or Firm—Edward D. Manzo

[57] ABSTRACT

A mutiple-purpose assembly clip for assembly of radiant ceiling panels and/or for flattening bowed radiant ceiling panels. The clip uses a "twist-lock" technique. In a first rotational position the clip is positioned over the panels. The clip is then rotated about an axis perpendicular to the panels to a second rotational position to cause flanges on the clip to engage corresponding channels on the panels, thereby to urge adjacent panels together. A "mirror image" clip is also used which twists in the opposite direction for locking. The clip includes a central cutout in a U-shaped member to form defined flanges and edges. The cutout is dimensioned so that as an alternative to use for locking adjacent panels (where the cutout fits over edge connections of the panels) it can fit over a fluid-carrying tube mounted on the rear of the panel. This permits the clip to be mounted wholly on one ceiling panel for flattening the panel.

31 Claims, 10 Drawing Figures

ASSEMBLY CLIP FOR CEILING PANELS

BACKGROUND OF THE INVENTION

The present invention relates to ceiling panels and apparatus for assembly of panels into an integral unit. The present invention has particular applicability to radiant ceiling panels.

Radiant ceiling panels today generally comprise a group of aluminum panels each having a copper tube therein carrying a heat exchange fluid such as water which is heated or cooled with respect to the temperature of the room in which the radiant ceiling panel is installed.

In the past, radiant ceiling panels have been assembled away from the installation site and then transported in assemblies which were mounted at the site. Several disadvantages resulted from this procedure. First, it was extremely difficult, if not impossible, to make adjustments in the ceiling panels at the job site. Second, the large assembled ceiling panels are especially susceptible to damage during transportation.

It is therefore the primary object of the present invention to provide a radiant ceiling panel and assembly device which allows radiant ceiling panels to be transported to the job site and assembled there.

Another object of the present invention is to provide a radiant ceiling panel and assembly device which facilitates modifications of the panels at the job site.

Another problem of prior art radiant ceiling panels is not due to the location of assembly but rather to the inherent structure of the panel. The problem is that radiant ceiling panels are generally made of aluminum and occasionally are discernably bowed. This is commercially disadvantageous because from an aesthetic point of view, radiant ceiling panels should be flat.

Therefore, another object of the present invention is to provide a device which can be used to counteract the bowing of radiant ceiling panels.

SUMMARY OF THE INVENTION

According to one aspect of the present invention, a ceiling panel is provided for engagement with a similar ceiling panel by means of an assembly clip. Each of these members has a retainer arrangement: each panel has a panel retainer arrangement, and the clip has a corresponding clip retainer arrangement. Additionally, in the illustrated embodiment, each ceiling panel includes a tongue at one longitudinal edge and a groove at the opposite edge so that two adjacent panels are engaged by their respective tongue and groove. The illustrated panel retainer arrangement includes an outer channel adjacent to the tongue and opening toward a central channel for the copper tube. Illustratively, each panel also includes a further inner channel which cooperates with the assembly clip. This further channel is associated with the tube channel and opening away therefrom, i.e., opening toward the channel associated with tongue or groove.

The illustrated assembly clip uses a "twist-lock" technique. The illustrated clip retainer arrangement includes four specially shaped flanges each dimensioned to engage a respective, corresponding channel. The illustrated assembly clip is made from a U-shaped steel member which includes a first sidewall, a base, and a second sidewall. The assembly clip includes a continuous cut-out in the first sidewall, through the base, and into the second sidewall. The edges of the cut-out in the base form two of the four flanges. The outer edges of the base form the two outer flanges. The flanges are in the same plane, illustratively.

In use, at the job site two ceiling panels are positioned adjacent to one another so that the tongue of one panel engages the groove of the second panel. Next, the ceiling clip is positioned over the tongue and groove. The cut-out in the base of the assembly clip is of a sufficient dimension to permit unrestrained vertical movement of the assembly clip onto the ceiling panel until the base of the assembly clip meets the rear face of the radiant ceiling panels. During this operation, the assembly clip is in a first rotational position with respect to the ceiling panels. After the clip is registered on the two ceiling panels, it is rotated to cause the four flanges to engage the four corresponding channels. The two inner flanges of the assembly clip engage the sidewalls of the corresponding (outer) channels in the ceiling panels, and increasing rotational movement of the assembly clip causes the flanges to urge the ceiling panels closer toward one another. At the same time, the outer flanges of the assembly clip engage the inner channels (associated with the tube channel) of the ceiling panels.

Preferably at least two assembly clips are used to join two adjacent panels. One assembly clip is dimensioned to lock by movement in a first rotational direction. The second assembly clip is in effect a "mirror image" of the first assembly clip and locks by movement in a second and opposite rotational direction. The use of such complementary assembly clips provides increased resistance against longitudinal movement of adjacent ceiling panels which, if only one assembly clip were used, could loosen and unlock the assembly clip depending upon the relative directions of longitudinal movement. However, with the use of two assembly clips, longitudinal movement is resisted, because although movement in one direction may tend to unlock one assembly clip, it will further tighten and lock the complementary assembly clip, and vice versa.

The assembly clip can serve the second purpose of flattening bowed ceiling panels. The illustrated clip is dimensioned so that it can be mounted wholly on one panel. The cut-out in the sidewalls is sufficiently large to permit the clip to be positioned on one panel with the cut-out wrapping around the water tube and the tube channel of the ceiling panel. In this use, the assembly clip uses the same twist-lock technique. The inner flanges of the assembly clip, when the clip is rotated from the first rotational position of the second rotational position, engage the inner channels of the panel i.e., the two outward facing channels associated with the tube channel. At the same time, the outer flanges of the assembly clip engage the outer channels of the ceiling panel, i.e., the inward facing channel associated with the tongue and groove. During this twisting, the base of the assembly clip, which is flat and formed of steel, stresses the aluminum ceiling panel, tending to flatten any bowing therein.

BRIEF DESCRIPTION OF THE DRAWINGS

A more complete understanding of the present invention will be gained by reading the following detailed description of a preferred embodiment, in which reference is made to accompanying drawings in which.

DETAILED DESCRIPTION OF A PREFERRED EMBODIMENT

Figure 1:
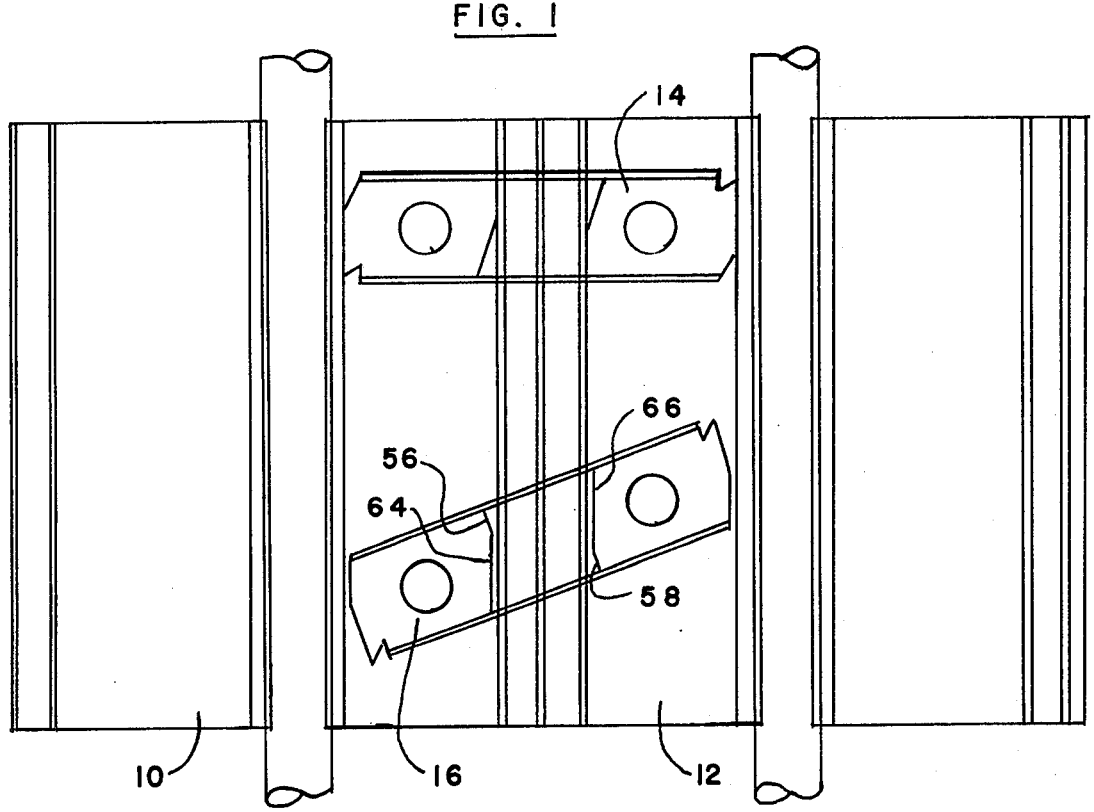
FIG. 1 is a plan view of two adjacent radiant ceiling panels with two illustrative assembly clips thereon, one in an unlocked position and the other in a locked position.

Referring to FIGS. 1 and 2, two identical radiant ceiling panels 10 and 12 are shown joined by an assembly clip 14. Assembly clip 14 uses a twist-lock technique so that in a first rotational position, the clip is unlocked, and in a second rotational position, the clip is locked. FIG. 1 shows a second assembly clip clip 16 in an unlocked position, i.e., in the first rotational position. Assembly clip 14 is in the second rotational position.

The assembly clip cooperates with the ceiling panels by means of a panel retainer arrangement on each of the panels and a clip retainer arrangement on the assembly clip.

Referring to FIG. 2, each radiant ceiling panel 10 includes a tube channel 18 engaging a copper tube 20. The tube channel 18 is located in the middle of the ceiling panel. Ceiling panel 10 includes a tongue 22 and groove 24, illustratively to the right and left, respectively, of tube channel 18. Tongue 22 and groove 24 facilitate the engagement of adjacent panels 10 and 12.

Figure 2A:
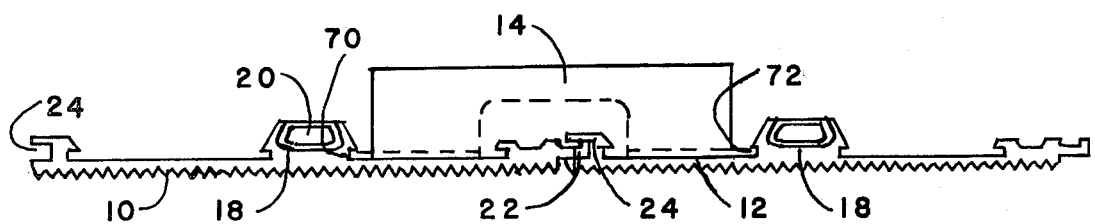
FIG. 2A is a side view of the two ceiling panels and the locked assembly clip of FIG. 1.
Figure 2B:
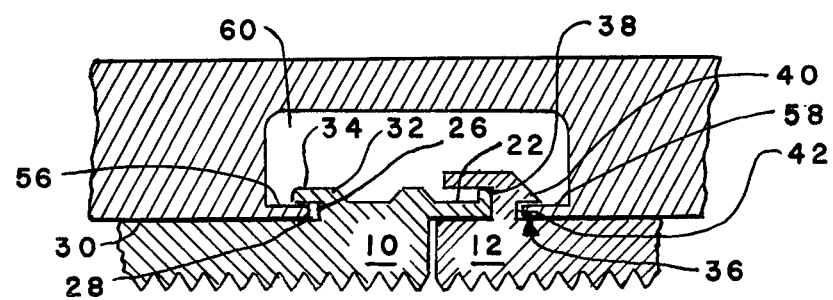
FIG. 2B is an enlarged side view showing the engagement of the assembly clip with the two panels of FIG. 2A.

The panel retainer arrangement on each of the panels includes a fixed surface 26 (FIG. 2B). Illustratively, the fixed surface 26 is part of a channel 28 near tongue 22. Channel 28 is formed by three surfaces. The first surface is the rear face 30 of panel 10. The second channel surface is a wall 32 extending perpendicularly from the rear surface 30. The third channel surface is a lip 34 extending from wall 30 toward the tube channel 18. It will be seen, therefore, that the channel 28 associated with groove 22 opens toward the tube channel 18.

Similarly, a channel 36 is formed in panel 12 and opens toward the tube channel 18 of panel 12. Channel 36, like channel 28, is formed by three surfaces, the rear face of panel 12, a perpendicular wall 38 and a lip 40. The wall 38 includes a surface 42 similar to surface 26.

Figure 3C:
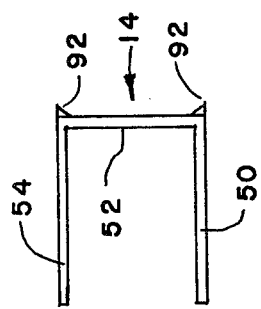
FIG. 3C is an end view of the assembly clip of FIG. 3A.
Figure 3A:
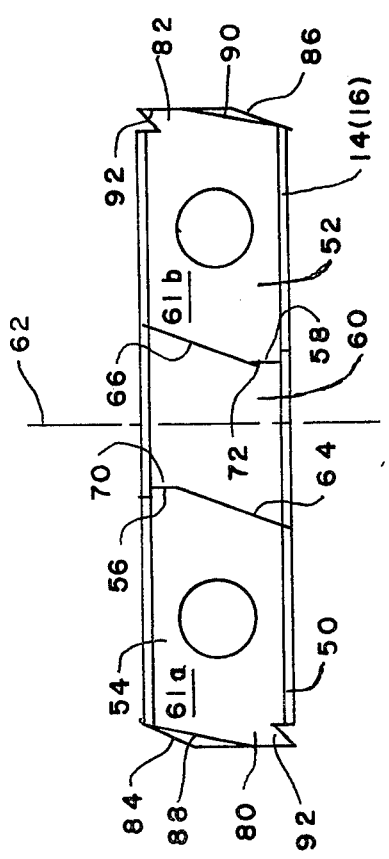
FIG. 3A is a plan view of an illustrative assembly clip.
Figure 3B:
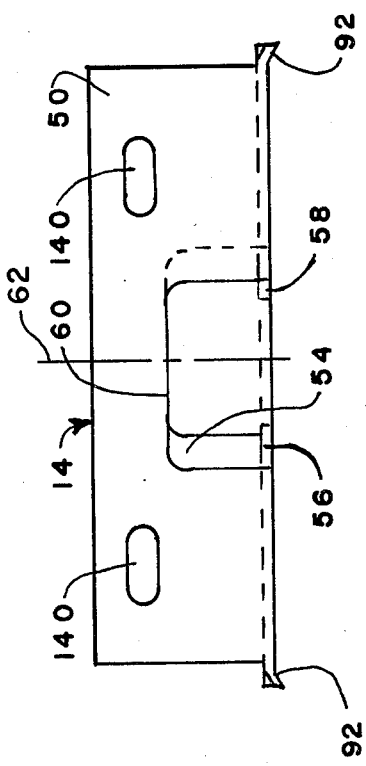
FIG. 3B is a side view of the assembly clip of FIG. 3A.

Referring to FIG. 3, assembly clip 14 illustratively is a U-shaped steel member having a first side wall 50, a base 52, and a second sidewall 54. A clip retainer arrangement of flanges 56 and 58 results from a continuous cutout 60 in the base and sidewalls of clip 14. Illustratively, the shape of cutout 60 in sidewalls 50 and 54 is an inverted U-shape, as seen in FIG. 3B. The cutout thus divides base 50 into two halves or feet, 61a and 61b.

Figure 4:
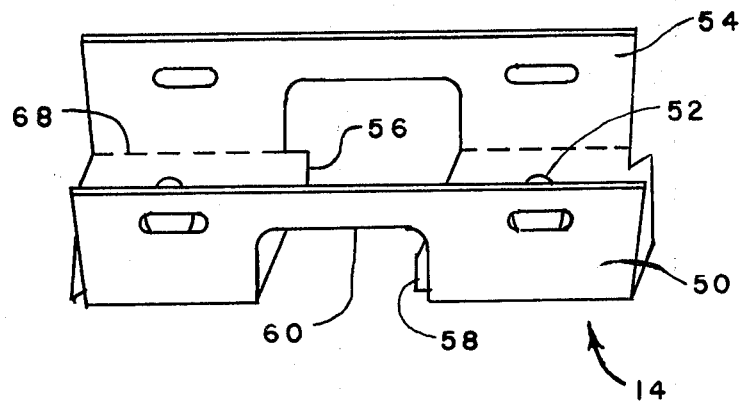
FIG. 4 is an orthogonal, perspective view of the assembly clip of FIG. 3A showing one of the fold lines thereof.

It will be observed that cutout 60 is not parallel to an imaginary center line 62 which divides base 52. Rather, cutout 60 includes parallel edges 64 and 66 which are at an angle of other than 90° with respect to the sidewalls 50 and 54, and with respect to a fold line 68 (FIG. 4) between wall 54 and base 52. The cutout also includes portions which are parallel to center line 62, i.e. edge 70 of flange 56 and edge 72 of flange 58.

Referring again to FIGS. 1 and 2B, the clip retainer arrangement cooperates with the panel retainer arrangement in the following manner. First, the assembly clip is placed in a first rotational orientation so that parallel edges 64 and 66 of the cutout are parallel to the longitudinal channels 28 and 36, and walls 32 and 38 thereof. Assembly clip 16 of FIG. 1 is shown in this rotational position. In this position, the cutout 60 will permit the clip 16 to be lowered over the engaged tongue and groove of adjacent panels 10 and 12 until the base 52 of clip 16 engages the rear surfaces of panels 10 and 12. In this position, neither flange 56 nor flange 58 engage channel 28 or 36.

Next, the assembly clip 16 is rotated to a second rotational position, as illustrated by assembly clip 14 of FIG. 1. During this movement, flange 56 moves into channel 58 until it meets fixed surface 26. Similarly, flange 58 moves into channel 36 until it meets fixed surface 42. Continued rotation of the assembly clip 14 causes the edges of flanges 56 and 58 to push surfaces 26 and 42 closer to one another, thereby more firmly engaging panels 10 and 12.

Referring to FIG. 2A, illustratively, another group of flanges and corresponding channels are provided. An outward facing channel 70 is associated with tube channel 18 (and thus is an "inner" channel). Channel 70 opens toward tongue 22. Similarly, panel 12 includes an inner channel 72 associated with its tube channel 18 which opens toward groove 24.

Referring again to FIG. 3A, assembly clip 14 includes an outer flange 80 to correspond with channel 70, and an outer flange 82 to correspond with channel 72. Illustratively, flange 80 includes an edge 84 parallel to edge 64. Similarly, flange 82 includes an edge 86 parallel to edge 66.

The length of assembly clip 14 is arranged relative to the width of the ceiling panels 10 and 12 so that when the assembly clip 14 is placed in the first rotational position as depicted by clip 16 in FIG. 1, edges 84 and 86 are parallel to channels 70 and 72. However, when the clip 14 is moved to the second rotational position, as depicted by clip 14 in FIG. 1, then flanges 80 and 82 respectively engage channel 70 and 72.

To facilitate the engagement of the flanges with the channels, the edges of the outer flanges may be coined as illustrated at 88 and 90. To maintain the clips in the locked position, the base 52 of the assembly clip 14 may be lanced to form barbs 92 which perform the same function as a lock washer.

Figure 5:
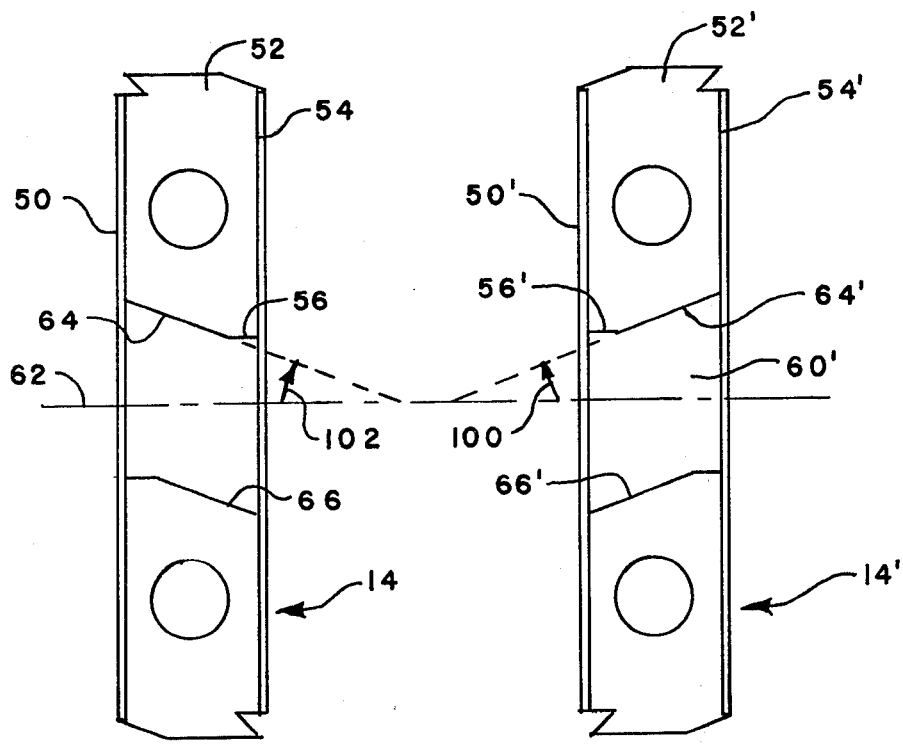
FIG. 5 illustrates the two mirror image assembly clips in plan view.

It will be appreciated that rotation of the assembly clip 14 from the first rotational position to the second rotational position urges panels 10 and 12 toward one another. However, the assembly clip can be unlocked by longitudinal movement of panel 10 relative to panel 12 in the proper direction. To guard against this, two assembly clips are used, one assembly clip being shaped to lock by rotation in the direction opposite to the direction required for locking the first assembly clip. Thus, while longitudinal movement of panel 10 relative to panel 12 may tend to unlock one assembly clip 14, it also tends to lock a complementary assembly clip 14' (FIG. 5). Assembly clip 14' is similar to assembly clip 14 and includes a sidewall 50', base 52', and second sidewall 54'. A flange 56' is formed by a continuous cutout 60' in the base and side wall. The cutout in the base results in parallel edges 64' and 66'. The angle 100 formed by the intersection of the imaginary line defined by edge 64' with center line 62 is equal in magnitude to the angle 102 formed by the intersection of the imaginary line defined by edge 64 and with center line 62. However, as can be seen in FIG. 5, the direction of these angles is opposite. Thus, it will be appreciated that the operation of assembly clip 14' is identical to the operation of assembly clip 14, except that whereas assembly clip 14 must be positioned in a first rotational position with respect to adjacent panels 10 and 12, assembly clip 14' must be placed at the same relative angle but in the opposite rotational direction in order to be positioned properly. Further, the direction of rotation for locking assembly clip 14 is opposite to the direction of movement for locking assembly clip 14'.

Figure 6:
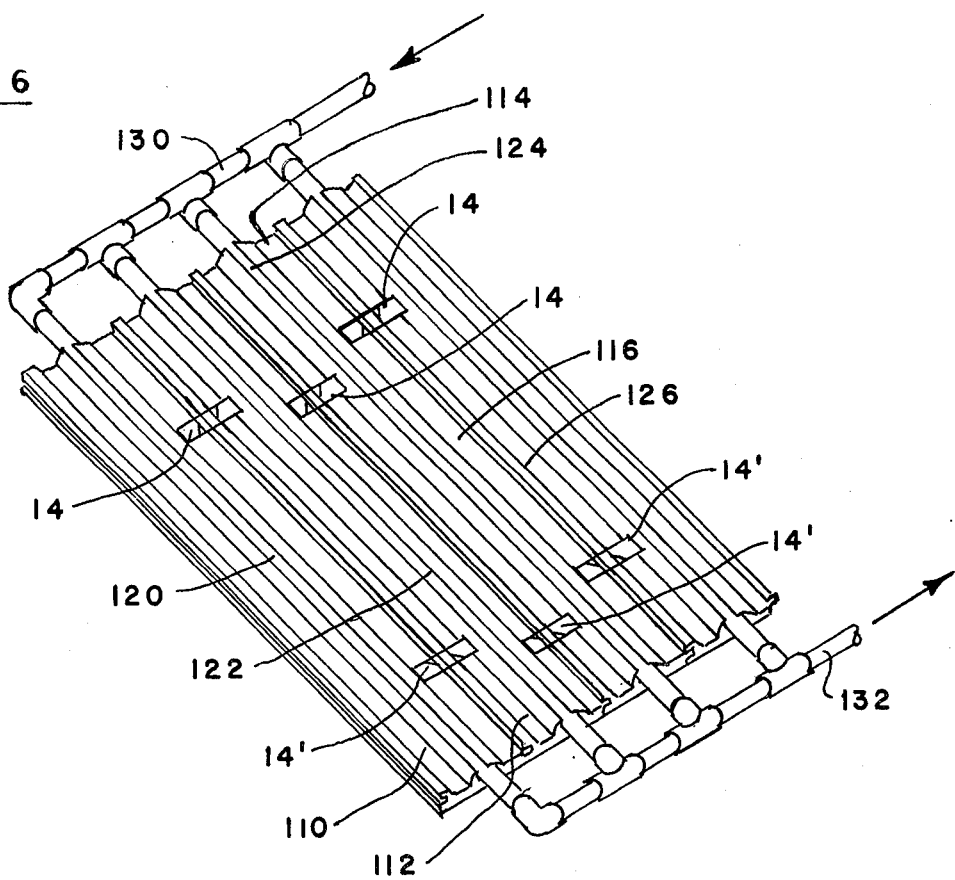
FIG. 6 illustrates a group of radiant ceiling panels assembled by the illustrated invented assembly clips.

FIG. 6 illustrates a group of ceiling panels 110, 112, 114 and 116 including respective water tubes 120, 122, 124 and 126. These tubes are connected by elbows and tees (not illustrated) to an inlet tube 130 on one side and to an outlet tube 132 on the other side.

A group of six assembly clips 14 and 14' join the four panels. This arrangement prevents the unlocking of the assembly clips by longitudinal movement of any of the panels 110, 112, 114, or 116 relative to an adjacent panel(s).

This group of four ceiling panels may be suspended from a structural support by fastening a suitable connecting member (not shown) to a means for mounting the clip to the support, such as holes 140 (FIG. 3B).

Figure 7:
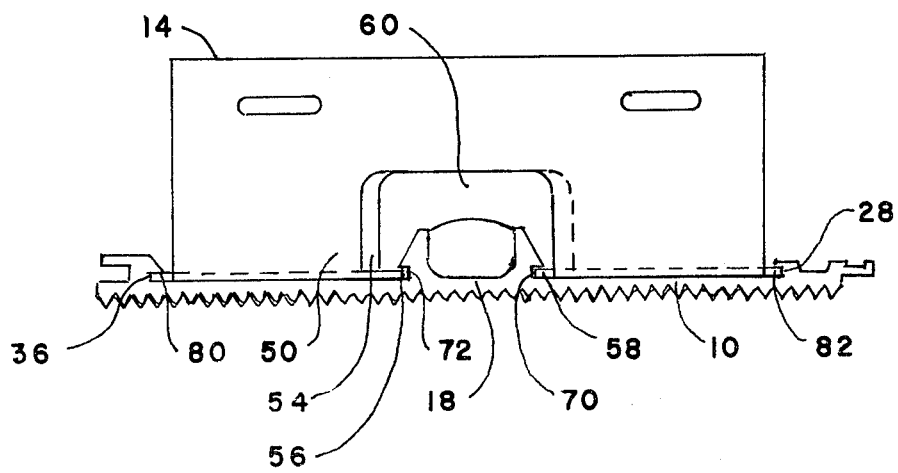
FIG. 7 is a side view of one ceiling panel with the assembly clip of FIG. 3A positioned over the tube channel for flattening the radiant ceiling panel.

Referring to FIG. 7, the assembly clip 14 may be used to flatten a bowed ceiling panel 10. Assembly clip 14 has its cutout 60 dimensioned so that clip 14 may be positioned as shown. In other words, the cutout 60 in sidewalls 50 and 54 is sufficiently large so that clip 14 may be positioned over the tube channel 18 in the first rotational position. When the clip is rotated to the second rotational position, the inner flanges 56 and 58 of clip 14 engage the inner channels 72 and 70, respectively, of panel 10. Similarly, the outer flanges 80 and 82 respectfully engage outer channels 36 and 28. Increased rotation of clip 14 urges channel 36 away from channel 72, and urges channel 28 away from channel 70. This tends to remove any bowing in the face of radiant ceiling panel 10.

By way of illustration, it has ben found that assembly clips 14 can be made from aluminized or galvanized steel which has a thickness of 0.048" or more. Illustratively, angle 100 may be approximately 20°. Indexing holes may be placed in the base 52 of clip 14 for proper machining.

Those who are skilled in the art will appreciate that various modifications can be made to the embodiment described herein without departing from the spirit of the present invention. Accordingly, it is intended that the foregoing description be taken in an illustrative sense, and that the scope of protection according to the present invention be defined by the appended claims.

The invented arrangement can be used for panels installed as wall or other surface panels.

Additionally, the invented arrangement can be used on panels which do not have a tube for carrying heat transfer fluid or can be used with panels having electrical resistance as a heat source.

In use the assembled panels are strengthened by use of a punched channel and pins. Specifically, the punched channel member is positioned between the vertical walls of the alighned clips and alighned with the holes in the vertical walls of the clips so that a number of pins can be inserted through the vertical walls of the clips and channel to provide stability to the assembled panels.

What is claimed is:

1. A ceiling, wall or the like formed from a group of panels and able to be assembled on-site in side-by-side fashion by the quick and simple application of coupling or locking devices comprising:
   first and second panels positioned adjacent to each other, each having front and rear faces;
   an assembly clip defining a flat surface;
   a panel retainer arrangement on each of said panels;
   a clip retainer arrangement on said assembly clip;
   said assembly clip being dimensioned to permit unrestrained vertical movement of said assembly clip until said flat surface thereon abuts a rear surface of said first and second panels when said assembly clip is in a first rotational position with respect to said panels;
   said clip retainer arrangement engaging said panel retainer arrangement when said assembling clip surface abuts said rear face and said assembly clip is oriented in a second rotational position with respect to said panels, said assembly clip being movable between said first and second rotational positions about an axis which is perpendicular to one of said faces of said panels, said panel retainer arrangements cooperating with said clip retainer arrangement to prevent lateral movement of said first panel with respect to said second panel;
   said panel retainer arrangements including respective fixed surfaces on each of said first and second panels; and
   said clip retainer arrangement including corresponding first and second flanges dimensioned for abuttment with said fixed surfaces when said clip is oriented in said second rotational position, said flanges being operative to urge said panels toward each other laterally with increasing rotation of said assembly clip.

2. The combination of claim 1 wherein said panel retainer arrangement on said first panel includes a fixed surface on said first panel, and wherein said clip retainer arrangement includes a flange for abuttment with said fixed surface.

3. The combination of claim 2 wherein said assembly clip flange includes a cam which engages said fixed surface only when said clip is oriented in said second rotational position, said cam lying in a plane parallel to the plane of a front or rear face of said panels and exerting a force urging said first panel toward said second panel in a lateral dimension when said assembly clip is rotated from said first rotational position toward said second rotational position.

4. The combination of claim 3 wherein each of said first and second panels includes first and second fixed surfaces, and wherein said assembly clip includes four corresponding flanges for abuttment with said fixed surfaces when said assembly clip is oriented in said second rotational position.

5. The combination of claim 3 or 4 wherein each of said fixed surfaces comprises a wall of a channel in said respective panel.

6. The combination of claim 5 wherein each of said channels includes first, second and third channel surfaces, said first channel surface being a rear surface of said ceiling panel, said second channel surface being a wall extending perpendicularly away from said rear surface, and said third channel surface being a lip extending away from said wall and over said rear surface, said perpendicular wall comprising said fixed surface for abutment with said assembly clip flange, corresponding ones of said lips of said first and second panels extending in opposing directions.

7. The combination of claim 5 wherein said channel is parallel to the longitude of said respective panel.

8. The combination of claim 1 wherein each of said panels includes a laterally projecting tongue at one longitudinal edge thereof, and a corresponding groove at the other longitudinal edge thereof.

9. A panel combination comprising:
first and second panels
a longitudinal tongue on one edge of each of said first and second panels;
a longitudinal groove at the other edge of each of said first and second panels, said tongue of said first panel dimensioned to engage said groove of said second panel;
a channel on said first panel opening away from said tongue on said first panel and toward said tube channel;
a channel on said second panel opening away from said groove of said second channel and toward said tube channel of said second panel;
an assembly clip for locking said first panel to said second panel, said assembly clip having a cut-out dimensioned to be positioned over said tongue and groove of said first and second ceiling panels;
first and second feet on said assembly clip, said first foot located on one side of said cut-out and said second foot located on other side of said cut-out;
first flanges on each of said first and second feet, each first flange being a cam which does not engage said channel when said assembly clip is in a first rotational orientation with respect to said panels, but engages said channel when said assembly clip is in a second rotational position with respect to said panels, whereby said assembly clip may be positioned with respect to adjacent ceiling panels whose tongue and grooves are coupled, and rotated to said second rotational orientation thereby to engage said first flanges with said corresponding channels to lock said first panel to said second panel.

10. The combination according to claims 1, 3 or 9, wherein one of said panels is a ceiling panel.

11. The combination of claim 1 or 10 wherein said assembly clip comprises:
a U-shaped member having a base and first and second side walls which form respective first and second parallel fold lines,
said member having a continuous cut-out in said first side wall, through said base, and into said second side wall,
said base cut-out including edges along lines parallel to each other, in the plane of said base and at an angle other than 90° with respect to said first and second fold lines;
said cut-out in said first and second side walls being similar in shape to each other, said first wall cut-out being laterally displaced in one direction from a center line of said base, said center line being perpendicular to said fold lines, said second wall cut-out being laterally displaced in the other direction from said center line.

12. The combination of claim 11 wherein said clip retainer arrangement includes respective flanges on opposite sides of said base cut-out adjacent said fold lines and at the two intersections of said base and said fold lines nearest to said center line.

13. The combination of claim 12 further including a second assembly clip substantially similar to said first-named assembly clip but arranged so that said base cut-out includes edges along parallel lines at an angle equal in magnitude to said first-named angle but opposite in direction.

14. The combination of claim 12 wherein said assembly clip further includes respective edge surfaces on each of said first and second feet and wherein said first and second ceiling panels include corresponding fixed surfaces positioned to abut said edge surfaces when said assembly clip is in said second rotational position.

15. The combination according to claim 14 wherein said fixed surfaces comprise a second channel on said first panel opening toward said tongue of said first panel and a second channel on said second panel opening toward said groove on said second panel, and wherein said assembly clip edge surfaces comprise second flanges on said first and second feet.

16. The combination of claim 15 wherein said second channels are associated with said tube channels.

17. The combination of claim 16 wherein said second flanges are located at the outer edges of said base and include respective edges perpendicular to said fold lines and respective edges parallel to said parallel base cut-out edges.

18. The combination of claim 17 wherein said second flanges are coined to facilitate engagement thereof with said second channels.

19. The combination of claim 17 wherein said assembly clip feet each are lanced.

20. The combination according to claim 10 wherein said assembly clip includes means for mounting said clip to a support behind said ceiling panel.

21. The combination according to claim 10 wherein one of said panels is a radiant panel having a longitudinal channel to receive a tube carrying a fluid for heat transfer.

22. The combination of claim 21 wherein said assembly clip is dimensioned so that when said assembly clip is in a first rotational position, said cut-out may be positioned over said tube channel and moved vertically with respect to said first or second ceiling panel until said feet contact said panel, said feet being dimensioned relative to said channels on said panel so that when said assembly clip is oriented in a second rotational position, said flanges engage said channels and said feet flatten said panel.

23. The combination according to claim 22 wherein said first and second ceiling panels are made of aluminum and wherein said assembly clip is made of steel.

24. An assembly clip for use with adjacent panels of predetermined dimensions comprising:
a U-shaped member having a base and first and second side walls which form respective first and second parallel fold lines;

said member having a continuous cut-out in said first side wall, through said base, and into said second side wall, said base cut-out including edges along lines parallel to each other, in the plane of said base and at an angle other than 90° with respect to said first and second fold lines, said cut-out in said first side wall being similar in shape to said cut-out in said second side wall, said first wall cut-out being laterally displaced in one direction from a center line of said base perpendicular to said fold lines, said second wall cut-out being laterally displaced in the other direction from said center line.

25. The combination according to claim 24 wherein said assembly clip includes means for mounting said clip to a support behind said ceiling panel.

26. The combination of claim 24 wherein said clip includes respective flanges on opposite sides of said base cut-out adjacent said fold lines and at the two intersections of said base and said fold lines nearest to said center line.

27. The combination of claim 24 or 26 wherein the panel is a ceiling panel which includes a tube channel and said assembly clip is dimensioned so that when said assembly clip is in a first rotational position, said cut-out may be positioned over the tube channel of the ceiling panel and moved vertically with respect to said ceiling panel until said base contacts said panel, said base being dimensioned relative to said panel so that when said assembly clip is oriented in a second rotational position, said flanges engage said panel and said base flattens said panel.

28. The combination according to claim 27 wherein said assembly clip is made of steel.

29. The combination of claim 26 wherein said assembly clip further includes second flanges located at the outer edges of said base, said second flanges including respective edges perpendicular to said fold lines and respective edges parallel to said parallel base cut-out edges.

30. The combination of claim 29 wherein said second flanges are coined to facilitate engagement thereof with corresponding channels in at least one of the panels.

31. The combination of claim 29 wherein said assembly clip base defines a pair of feet, each of which are lanced.

* * * * *